(12) United States Patent
Dischert et al.

(10) Patent No.: US 7,061,509 B2
(45) Date of Patent: Jun. 13, 2006

(54) METHOD AND APPARATUS FOR KEYING OF SECONDARY VIDEO INTO PRIMARY VIDEO

(75) Inventors: Lee R. Dischert, Burlington, NJ (US); Daniel Charnitsky, Mullica Hill, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 712 days.

(21) Appl. No.: 09/796,962

(22) Filed: Mar. 1, 2001

(65) Prior Publication Data

US 2002/0122046 A1     Sep. 5, 2002

(51) Int. Cl.
*G09G 5/00* (2006.01)
*H04N 7/00* (2006.01)

(52) U.S. Cl. .............. 345/629; 345/633; 345/638; 348/582; 348/584; 348/590

(58) Field of Classification Search ............. 348/564, 348/588, 554, 552, 582, 579, 584–586, 587, 348/590–594, 578, 589, 596; 345/718–719, 345/632–633, 629–630, 638–641

See application file for complete search history.

(56) References Cited

U.S. PATENT DOCUMENTS

| | | | | |
|---|---|---|---|---|
| 5,583,536 A | * | 12/1996 | Cahill, III | 345/641 |
| 5,621,428 A | * | 4/1997 | King et al. | 345/641 |
| 5,696,527 A | * | 12/1997 | King et al. | 345/634 |
| 5,798,799 A | * | 8/1998 | Jordan et al. | 348/552 |
| 5,912,711 A | * | 6/1999 | Lin et al. | 348/446 |
| 6,359,653 B1 | * | 3/2002 | Huang | 348/447 |
| 6,359,657 B1 | | 3/2002 | Westerink et al. | |
| 6,628,340 B1 | * | 9/2003 | Graczyk et al. | 348/552 |

* cited by examiner

*Primary Examiner*—Matthew C. Bella
*Assistant Examiner*—Wesner Sajous
(74) *Attorney, Agent, or Firm*—RatnerPrestia

(57) ABSTRACT

Apparatus for inserting an externally supplied video image into a computer graphics image. A TV card (131), responsive to synchronization signals, is connected to a video source to receive and convert an input video stream and also connected to provide a scaled and positioned video image (754) synchronized to a computer graphics image. A graphics card (150) is configured to provide the TV card (131), with a computer graphics image (652) having an embedded color key signal, video scaling and positioning parameters and horizontal and vertical synchronization signals. A window keyer (260) is connected to the TV card (131) and the graphics card (150) to provide the video stream and the computer graphics image to a computer monitor (170).

10 Claims, 8 Drawing Sheets

METHOD AND APPARATUS FOR KEYING OF SECONDARY VIDEO INTO PRIMARY VIDEO

BACKGROUND OF THE INVENTION

The present invention relates to computer systems and in particular to an improved technique for displaying decoded television video images on a computer monitor as a window in a computer desktop display.

A typical computer system for example, a conventional Personal Computer (PC) may be augmented with a television (TV) receiver card capable of being plugged in to a Peripheral Component Interchange (PCI) bus of that PC. The card enables the PC to receive the full range of television broadcast including digital and analog television signals. A card of this type normally has a coaxial connector for an antenna input. While one is watching TV, the Central Processor Unit (CPU) of the PC is not involved in the process. Thus, the television image can be resized so that, for example, the viewer can check his or her e-mail without affecting the television image.

In a typical multimedia computer system, displaying decoded television video signals from an analog TV card is typically performed by decoding and digitizing the analog video signal and sending digital video signals over the PCI bus or other computer bus to a graphics card. The digital video signals are then displayed on a computer monitor as a window on the computer desktop display. Such devices have been unsatisfactory in that only low-resolution video can be displayed due to limitations resulting from the bandwidth of the computer bus.

The Graphics card, which is also plugged into the PCI bus, contains the necessary video memory and other electronics to provide a bitmap display and normally requires a software driver such as Microsoft Direct Draw ®.

As used herein, the terms "TV Card" and "Graphics Card" are not restricted to separate printed circuit cards that may be plugged into or removed from connectors mounted on the PC motherboard. These terms also include TV processors and graphics processors or corresponding software processes that are implemented in other forms, such as being a part of the motherboard or that are implemented in computer systems that do not include a motherboard.

TV cards are incapable of providing a smooth or stable picture when used in combination with a graphics card. The resulting image may exhibit, for example, a slight jittery up and down motion that is very distracting. Other problems with existing TV cards include digital artifacts such as jagged borders between light and dark areas. Other types of distortion include signal converter interference which may produce wavy lines running at vertical angles through the picture.

FIG. 1 illustrates a conventional circuit within a personal computer 120. The TV card 130 receives broadcast television signals from an antenna 100 and outputs a digitized video signal to a PCI bus 140 for transmission along the bus. A graphics card 150 connected to the PCI bus 140 receives the digitized video signal and after processing, outputs a RGB video signal 162 to a computer monitor 170. The decoded TV signal is represented on the computer monitor 170 as an area 172 in the computer desktop display 174. This method has a serious drawback because it can only display low resolution video due to the limitation on the PC bus bandwidth.

Again referring to FIG. 1, another method to input television video into the desktop display uses a feature connector. The feature connector is a 8 bit expansion bus for a graphics card that has been standardized by Video Electronic Standards Association (VESA). The feature connector is provided on some graphics cards to receive video images from a TV card to avoid the bandwidth limitations of the PCI bus. Transferring video over a cable 134 from the TV card 130 to the graphics card 150 creates potential for violating the copyright protection of the digital video, however, because a peripheral taping device could easily be connected to the cable to intercept the signal while transferring the digital video information.

Another method for inserting television video into a desktop display is disclosed in U.S. Pat. No. 5,621,428 entitled AUTOMATIC ALIGNMENT OF VIDEO WINDOW ON A MULTIMEDIA SCREEN, to King et al. This patent describes a method by which television video data is merged into a desktop display using a conventional chroma key technique. The video card inserts a predetermined color into a window area on the desktop display where the TV video data will be displayed. An analog multiplexer then switches the television video data into the desktop display to replace pixels having the predetermined color.

One problem with this system is the alignment of the television signal and the window in the desktop display. The referenced patent overcomes this problem by storing a predetermined color as a color key in place of the inset image in a motion video memory. The system detects the chroma color and the color key value in the combined image produced by the graphics card to determine, by their relative timing, if the inset image is not properly aligned with the desktop display. Any misalignment is compensated for by adjusting the delay in providing the television video data from the buffer memory. Once this timing has been adjusted, the color key data is replaced by active video.

SUMMARY OF THE INVENTION

The general purpose of this invention is to provide a method for inserting video data from a TV card into a computer display image of a computer system.

Under control of the computer operating system a graphics card generates computer display images, a selected color key, and a size and a position parameters for an area to be used for inserting the video data from the TV card. The graphics card sends the computer display image, the selected color key, as well as the size and position of the video window to the TV card via the computer bus. The TV card scales and positions the video data according to the information received from the graphics card. The TV card next adds a background color having the same value as the color key in the rest of the image except for the scaled and positioned video. Using a matching background color for the video data and the color key, insures that if the computer display includes any colors close to the color key, the switched signal defaults to the key color. The TV card then converts the scaled, positioned video and color background into an RGB signal. A window keyer device receives the RGB signal from the TV card and the computer display images from the graphics card and provides a composite signal comprising the computer display image and the inset television video image to the computer display monitor.

According to another aspect of the invention, the computer video card is synchronized to the vertical and horizontal synchronization signals provided by the TV card. Briefly, the TV card receives signals from an external video source such as an antenna. A graphics card receives control information from a computer software program, and provides synchronization signals to the TV card as well as providing size and location information for the inset image. The TV card, after receiving the synchronization signal and position information from the graphics card, provides an output signal to a window keyer. The graphics card also provides computer desktop video to the window keyer. The computer video from the graphics card is processed by the window keyer to generate a key or video switching signal. The window keyer uses the computer image as a color key source.

The invention avoids the transfer of digital television video as done in the past, namely from the TV card to the graphics card. In so doing the invention has avoids the drawback of only being able to display low resolution video due to the limitation of the computer bus bandwidth. Because the data is synchronized to, and merged with the computer desktop data, synchronization problems are avoided. There are no adverse effects from transferring the computer video from the graphics card to the digital television card. In fact this method avoids the problem of permitting the copying of digital video from the computer bus.

For a better understanding of these and other aspects of the invention reference may be made to the following detailed description taken in conjunction with the accompanying drawings.

BRIEF DESCRIPTION OF THE DRAWINGS

This invention will be readily appreciated as the same becomes better understood by reference to the following detailed description when considered in connection with the accompanying drawings in which like references numerals designate like parts throughout the figures thereof and wherein.

DETAILED DESCRIPTION OF THE EXEMPLARY EMBODIMENTS

Figure 1:
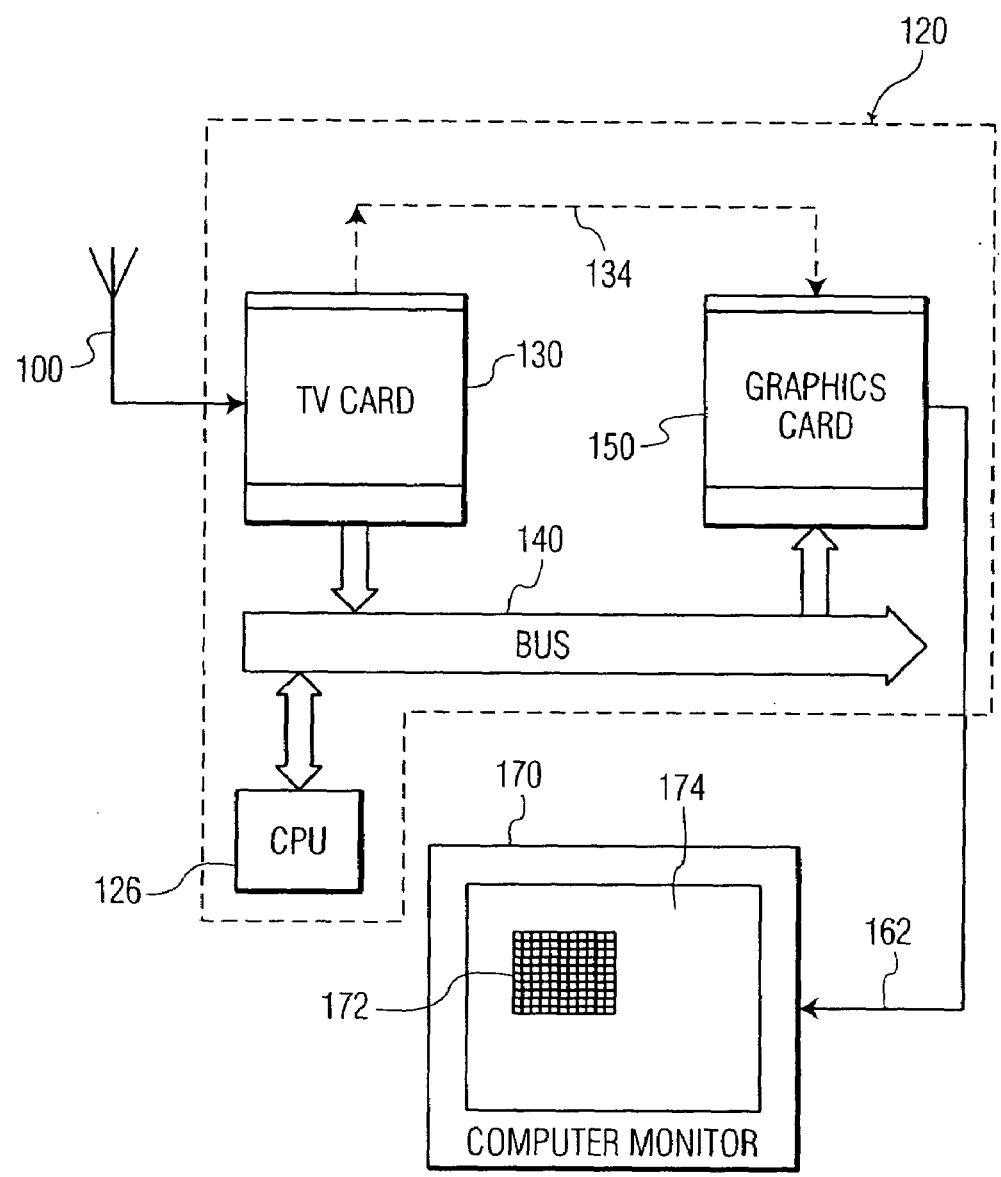
FIG. 1 (prior art) is a block diagram of a conventional personal computer incorporating a TV card.
Figure 2:
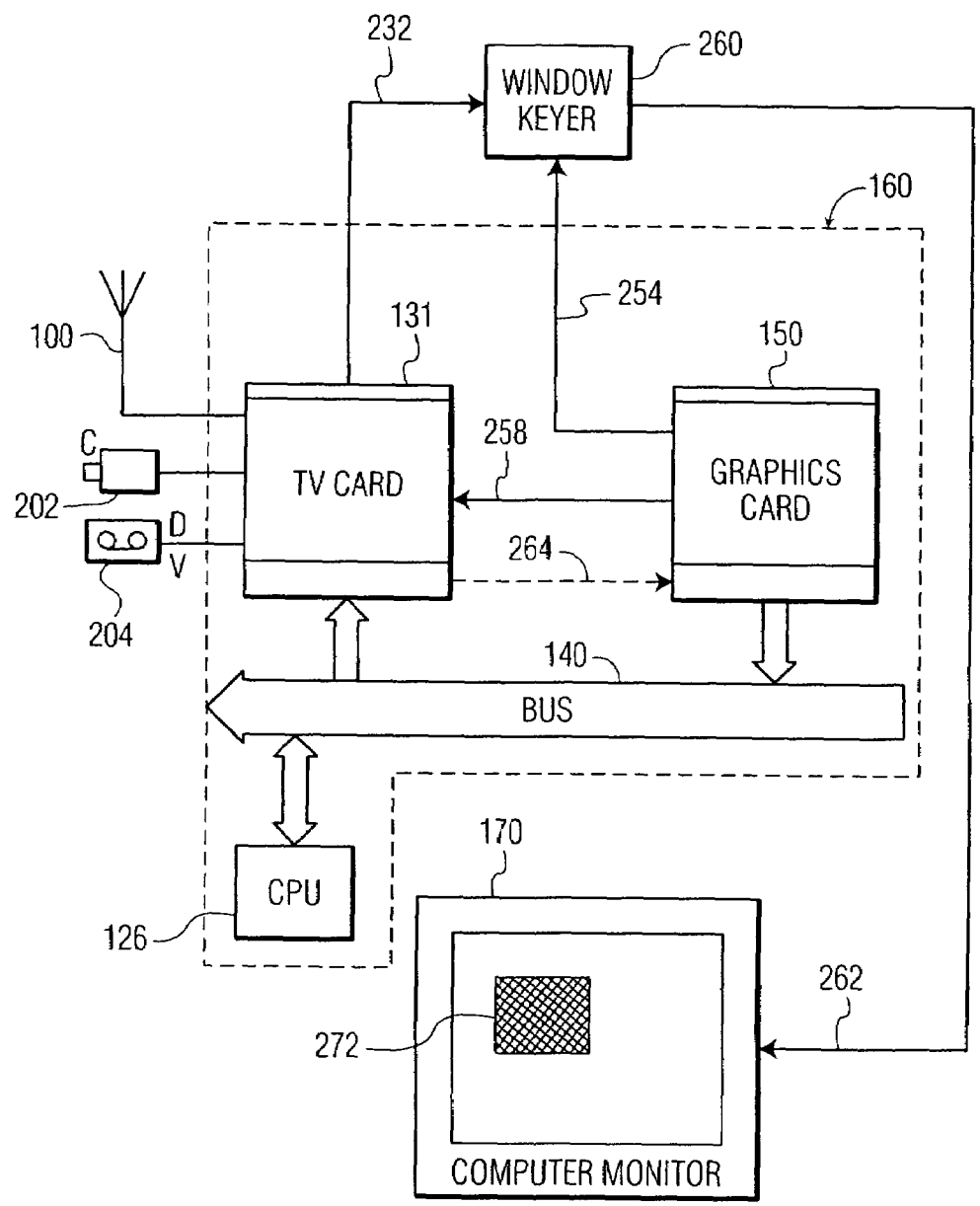
FIG. 2 is a block diagram of a system in accordance with a first embodiment of the invention.
Figure 9:
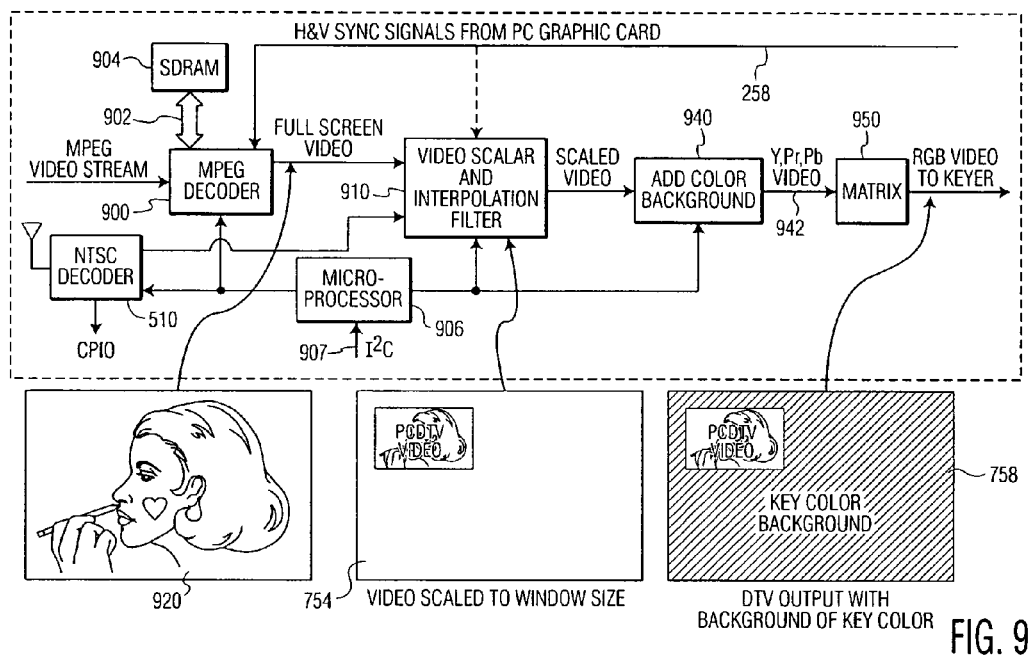
FIG. 9 is a functional block diagram of an exemplary TV card suitable for use in the present invention.

FIG. 2 is a block diagram illustrating one embodiment of the present invention. In FIG. 2, a TV card 131, described in more detail below with reference to FIG. 9, is connected to receive input television signals (analog or digital) such as might be provided by an antenna 100, a video camera 202, or a digital recorder 204 or other source. The input signal may include for example digital television video having at the highest resolution, 1080 by 1920 pixels per frame.

Figure 6:
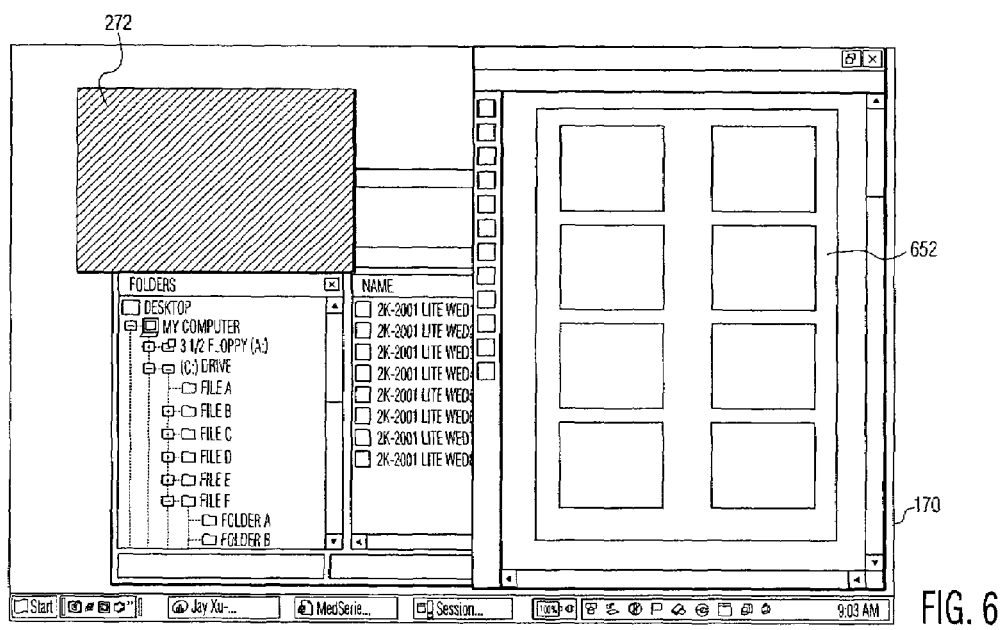
FIG. 6 is a computer display that illustrates a computer desktop image having a defined key area.

The TV card 131 is configured to have a standard Peripheral Component Interchange (PCI) interface connector, for connecting to a PCI bus 140 of a computer 160. It is contemplated that other types of data buses may be used. The TV card 131 receives and sends digital data via the PCI bus 140. Of significance to one embodiment of the invention however, is that the TV card 131 receives graphics data through the PCI bus 140 comprising, data describing video image size, and video image coordinates that correspond to a key area 272 defined herein below. FIG. 6, for example, shows a computer desktop image 652 including a key area 272 having a background color. TV card 131 also receives, horizontal and vertical synchronization pulses 258 from the graphics card 150 to genlock the TV card 131 to the graphics card 150. Alternately it is also possible for TV card 131 to produce horizontal and vertical synchronization pulses 264 and to provide genlock to the graphics card 150. When genlocked, the TV card 131 provides video images having the same horizontal and vertical timing as the images provided by the graphics card 150. Referring to FIG. 2, when TV card 131 receives the graphics data from the graphics card 150 via PCI bus 140 and the signal input from, for example, antenna 100, the TV card 131 decodes and scales the full screen video image, to produce a reduced-size image, positions the reduced-sized image as indicated by the received size and coordinate parameters received and inserts the selected key color in all areas of the image not occupied by the scaled video image. To scale and position the video image, the TV card 131 may receive parameters describing the coordinates, size and color of the key area 272 or it may simply receive the computer desktop image shown in FIG. 6 and extract the parameters from the image.

Figure 7:
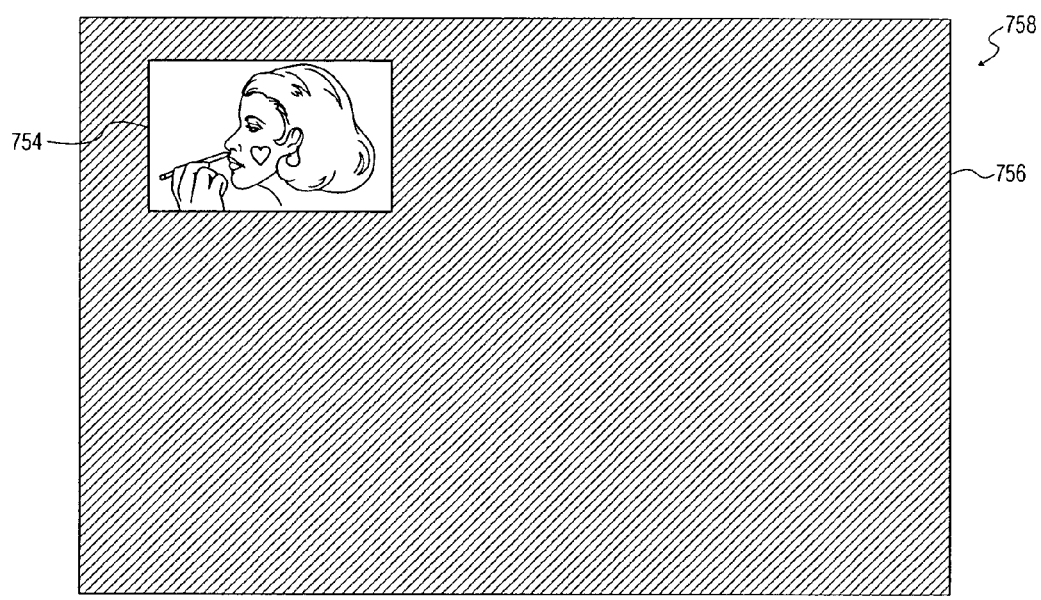
FIG. 7 is a computer display that illustrates a sized and positioned video data inserted in the key area of FIG. 6 and a background which matches the key color.

FIG. 7 is an image representing the signal provided by the TV card 131 which illustrates the insertion of the selected color key color in all areas 756 of the image not occupied by the scaled video image 754. As described above, the graphics card 150 provides the parameters describing the size and location of the key area 754 to the TV card 131. Alternatively a computer software program resident in the CPU 126 (e.g. the Windows® operating system) may provide the size and position information to the TV card 131

Figure 8:
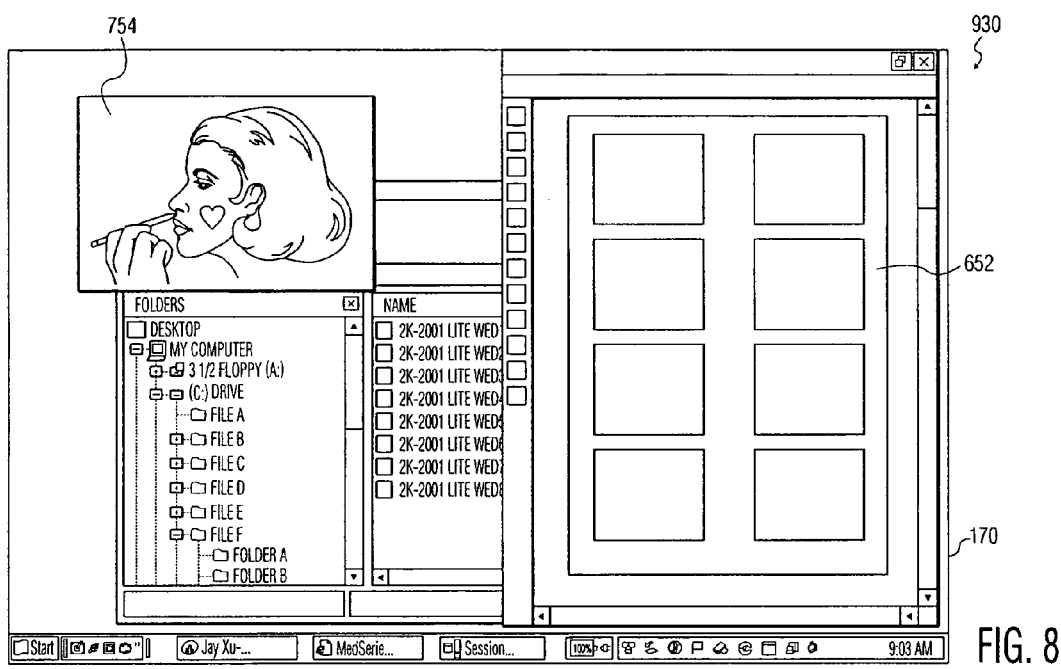
FIG. 8 a computer display that illustrates a composite of the video data of FIG. 7 inserted in a computer desktop image of FIG. 6.

FIG. 8 illustrates a composite video image 930 which comprises the scaled and positioned TV video image 754 and the computer desktop video image 652 that is provided via interconnecting cable 262 (FIG. 2) to the computer monitor 170. Referring to FIG. 2, the graphics card 150 provides the computer desktop video image 652 (FIG. 6) via the PCI bus 140 of the computer to of TV card 131. Graphics card 150 also provides an RGB computer desktop image (FIG. 6) via cable 254 to a window keyer 260.

As shown in FIG. 2, in combination with FIGS. 6, 7, and 8, the TV card 131, after receiving a control signal from the PC software, decodes and scales an analog or digital input television signal either from an antenna 100 or a camera 202 or a playback deck 204 to fit the decoded video image into the key area 272 (FIG. 6) defined by coordinates conveyed from the graphics card 131. In the exemplary embodiment of the invention, both the size and location of the TV video on the desktop are controlled by the PC software. The scaled and positioned video image shown in FIG. 7, has a color background 756 that is the same color as the color key of key area 272 shown in FIG. 6 The scaled and positioned video image (FIG. 7) is applied to the window keyer 260 through cable 232. Because the TV card 131 is genlocked to the horizontal and vertical synchronization signals provided by the graphics card 150, the video image 754 is properly aligned with the key area 272.

The window keyer 260 is also connected to receive, from graphics card 150 through cable 254, a computer desktop image 652 (FIG. 6). Window keyer 260 provides, to monitor 170 via cable 262, a signal 930 (FIG. 8) comprising a composite image of the TV video image, scaled to fit key area size 272, (FIG. 6), and inserted in the computer desktop image 652 (FIG. 6).

Figure 3A:
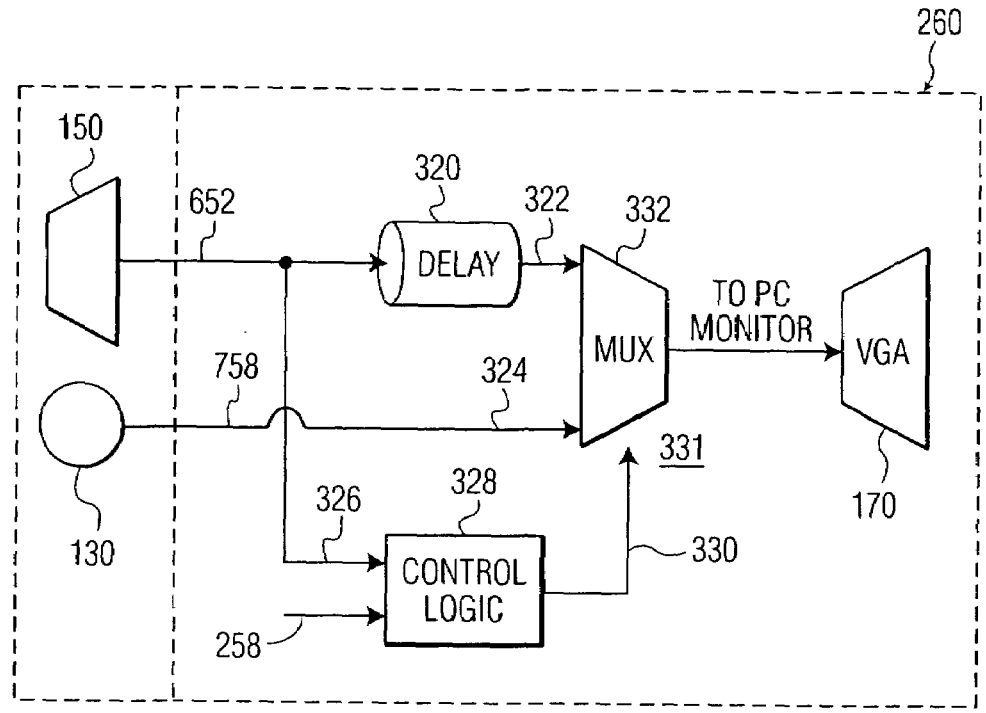
FIGS. 3a and 3b are block diagrams of a window key circuit suitable for use in the system shown in FIG. 2.

In the block diagram of FIG. 3a, window keyer 260 uses the RGB computer desktop video image 652, (FIG. 6) from the graphics card 150 as a color key source. RGB computer desktop image 652 is delayed by compensation delay 320 to compensate for signal propagation through the control logic. The delayed RGB computer desktop image 652 is applied to input port 322 of multiplexer 332. TV card 131 provides, as its output signal 758 (FIG. 7), the scaled and positioned video signal 754 with key color background 756, to input port 324 of multiplexer 332. Control logic 328 receives the computer desktop image 652 on input terminal 326 and processes the signal. When control logic 328 encounters pixels having the key color value in the computer desktop image signal 652, it provides a color key multiplexer control signal 330 to the multiplexer 332. This signal causes the multiplexer 332 to pass the scaled and positioned video signal 754 with color background 756 in place of the computer desktop image. Otherwise the multiplexer passes the computer desktop image 652 to the monitor 170. The present invention provides that background color 756 is the same value as the key area 272 color. Using the same background color 756 as the color of key area 272 insures that if the desktop image incidentally includes pixels having the key color outside of the key area, the displayed image will also have key color pixels at those positions.

Figure 3B:
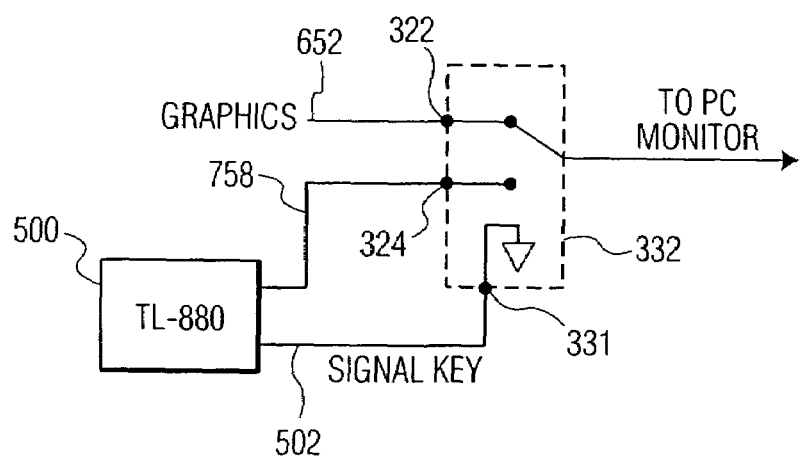
Figure 4:
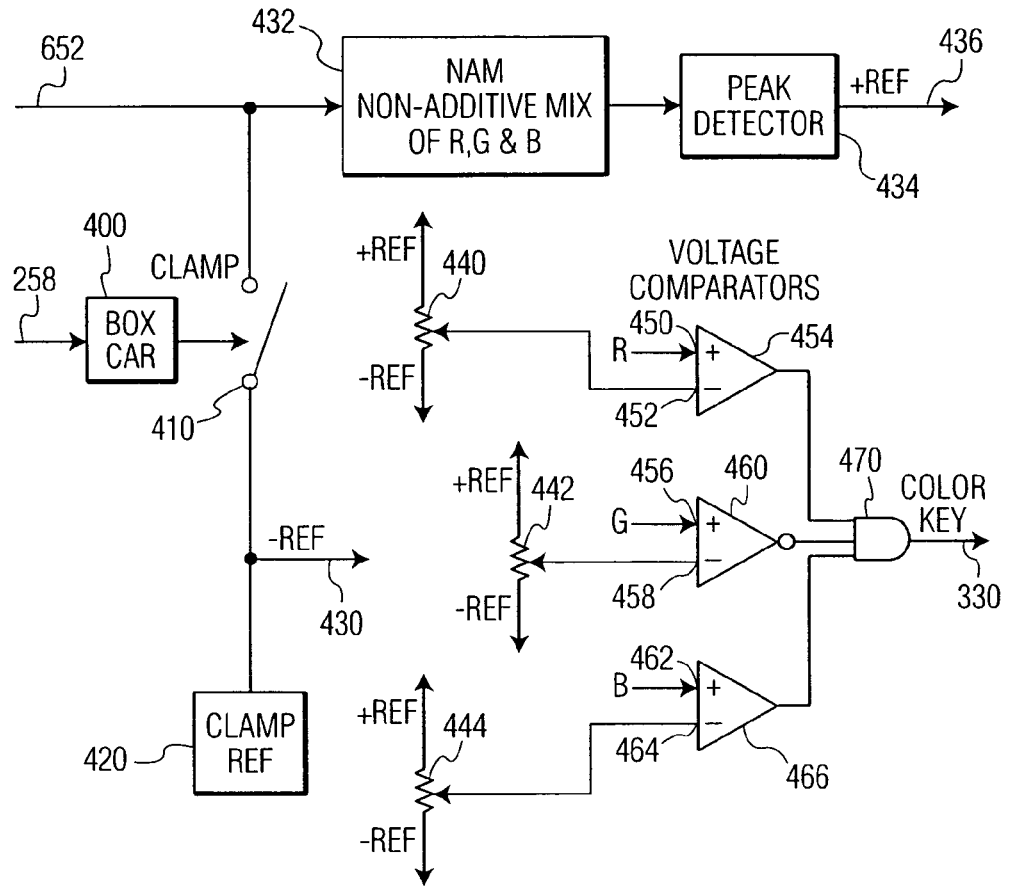
FIG. 4 is a block diagram illustrating exemplary control logic suitable for use in the key circuit of FIG. 3.

In FIG. 4, the control logic block 328 (of FIG. 3) is expanded to show the processing used to generate the color key 330. The computer RGB desktop image 652 is provided to a non-additive mixer 432. Non-additive mixers are well known in the art. Peak detector 434 is connected to receive the output signal of the non-additive mixer and to generate a positive reference voltage 436 corresponding to the maximum value of the output signal. The computer RGB video signal is also connected to one side of a single pole single throw switch 410. The computer horizontal synchronization pulse 258 generated by the graphics card 150 is connected to boxcar wave-shaping circuit 400. The output of boxcar circuit 400 is a pulse signal having rapid rise and fall times corresponding to the horizontal synchronization pulse on each horizontal line. This signal provides a pulse for switching clamp switch 410 so that computer RGB image 652 is connected to a negative clamp reference voltage supply 420 during the horizontal blanking interval.

Computer RGB desktop image 652 is connected so that the R (Red) portion of the RGB video is provided into input terminal 450 of voltage comparator 454, the G (Green) portion of RGB image 652 is provided into input terminal 456 of voltage comparator 460, and the B (Blue) portion of the RGB image is provided into input terminal 462 of voltage comparator 466. First comparator 454, second comparator 460 and third comparator 466 have their respective inputs 452, 458 and 464 connected to the movable tap of respective reference potentiometers 440, 442 and 444. The minus reference voltage 430 is connected to the one end of each of the potentiometer 440, 442 and 444. Positive reference voltage 436 is connected to the opposite end of potentiometers 440, 442 and 444. An AND gate 470 is connected to receive the output signals of the comparators 454, 460 and 466. When signals 450, and 462 exceed the reference signal values applied to input terminal 452, and 464, and when signal 456 is less than reference signal value applied to input terminal 458 a color key signal 330 is generated at the output of AND gate 470. In summary the computer RGB desktop image 652 is compared with reference voltages to generate a color key signal 330 when signals representing a particular color are present in the RGB signal provided to graphics card 150. In the exemplary embodiment of the invention, the selected color is saturated magenta representing the R and B signals at approximately their maximum values and the G signal at its minimum value. This is because the output of the G comparator 460 is inverted and only provides a logic-high output signal only when the G signal is less than the reference signal.

Figure 5:
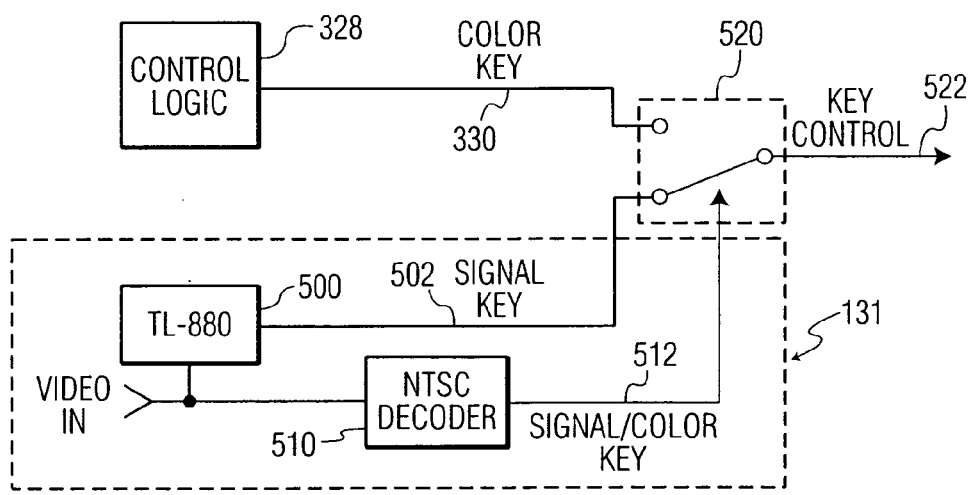
FIG. 5 is a block diagram that illustrates another embodiment of the control logic of FIG. 3.

FIG. 5 shows an alternative embodiment of the windows key circuit. This circuit includes control logic 328 which is substantially the same as the control logic 328, shown in FIG. 3. In addition, the circuit includes a television card 131 including a TL-880 digital television decoder 500 and an NTSC decoder 510. The TL880 decoder is available from Panasonic, Inc. In this exemplary embodiment of the invention, the TL-880, responsive to parameters received via the PCI bus 140, generates a separate key signal that does not use the key color. Because the key signal is generated from signals provided via the PCI bus 140, it is known as a signal key 502 rather than a color key 330. The TV card 131 indicates that the signal key 502 is being used via the general purpose input/output (GPIO) bits of the NTSC decoder 510. At least one of these bits is applied to control a multiplexer 520 which passes the color key 330 or the signal key 502 as the key control to the multiplexer 332, shown in FIG. 3.

In the block diagram of FIG. 3b, another embodiment of the window keyer 260 the RGB computer desktop video image 652, (FIG. 6 ) is coupled directly from the graphics card 150 to input port 322 of multiplexer 332. A TL-880 digital television decoder, 500 described herein below provides an output signal 758 (FIG. 7), including the scaled and positioned video signal 754 with key color background 756, to input port 324 of multiplexer 332. In accordance with the size and position parameters received via the PCI bus 140 the TL-880, 500 provides a signal key 502, to multiplexer control connection 331 of the multiplexer 332 causing the multiplexer 332 to pass the scaled and positioned video signal 754 with color background 756 in place of the computer desktop image.

FIG. 9 is a block diagram of an exemplary digital television (DTV) card suitable for use with the subject invention. The Advanced Televisions Systems Committee (ATSC) digital TV formats are broadcast over the airwaves and may be picked up by an antenna, received via a cable television system or from a satellite antenna and provided to the digital TV (DTV) card. The exemplary DTV card includes a DTV decoder 900 (e.g. the TL880 decoder) that decodes a video stream which has been encoded according to the standard specified by the Moving Picture Experts Group (MPEG). This decoder stores the input MPEG video stream, intermediate reference images and the output image that is to be displayed in synchronous dynamic random access memory (SDRAM) 904. An exemplary MPEG decoder is described in U.S. Pat. No. 6,175,592 Entitled FREQUENCY DOMAIN FILTERING FOR DOWN CONVERSION OF A DCT ENCODED PICTURE. The full-size video image provided by the MPEG decoder 900 is provided to a video scalar and interpolation filter 910 which reduces the image to a size specified by the parameters and positions the reduced image at the coordinates specified in the parameters. The horizontal and vertical synchronization signal 258 is provided to MPEG decoder 900 and alternatively to video scalar and interpolator filter 910 for the purpose of genlocking the signal provided by the DTV card with the signal provided by the graphics card 150. The scaled video image is then applied to circuitry 940 that adds a color background. As described above, this color is desirably the same as the key color. The output signal of the circuitry 940 is an analog component signal including a luminance component, Y, and two color difference components, Pr and Pb. These signals are applied to a conventional color matrix circuit which combines the Y, Pr and Pb signals to produce red, green and blue primary color signals, R, G and B.

As shown in FIG. 9, the MPEG decoder 900, video scalar and interpolation filter 910 and the color background circuitry 940 are controlled by a microprocessor 906. The microprocessor 906 receives the parameters from the PCI bus 140 using decoding circuitry (not shown) that formats the parameter data onto the format used by the Inter-Integrated Circuit Control (I²C) bus 907. The decoding of MPEG video bit-stream by the decoder 900, the scaling and positioning of the image by the circuitry 910 and the addition of the color background by the circuitry 940 are all performed responsive to the microprocessor 906. In addition, the DTV card 931 includes a decoder 510 that receives and demodulates analog television signals conforming for example to the National Television Standards Committee (NTSC) standard. As set forth above, this decoder includes a general purpose input/output (GPIO) bus that may be used to indicate to the multiplexer 520, shown in FIG. 5, that the DTV card 931 is providing the signal key 502 to switch between the computer desktop video signals and the video signals provided by the matrix 950. When the microprocessor is programmed to generate the signal key 502, it programs the NTSC decoder 510 to provide the signal key 502 or color key 330 to the multiplexer 520, as described above with reference to FIG. 5. Another bit of the GPIO signal provided by the NTSC decoder may be used to provide the signal key 502 to the multiplexer 520. Alternatively the microprocessor 906 may include output pins (not shown) that provide one or both of the signal key and the signal key switching signal, described above.

The NTSC decoder 510 also produces full screen video that provides an alternate input source for video scalar and interpolation filter 910.

Many modifications and variations of the present invention are possible in light of the above teaching. It is therefore to be understood that, within the scope of the appended claims, the invention may be practiced otherwise than as specifically described.

What is claimed:

1. A method for inserting video data from a TV card into a computer display image of a computer system, said method comprising the steps of:
    transferring key area parameters defining a size and a position of a window in the computer display image;
    generating a color key;
    generating, in a graphics card, responsive to the key area parameters, an imbedded color key area on the window in the computer display image for displaying the input video image;
    generating a color key signal which has a first value when picture elements in the key area are being sent to the display in the key area and a second value otherwise;
    transferring at least one synchronizing signal from the TV card to the graphics card to synchronize the TV card and the graphics card with each other;
    providing, responsive to the color key signal having the first value, the video data from the TV card to a computer monitor; and
    providing, responsive to the color key signal having the second value, the computer display screen images to the computer monitor.

2. The method of claim 1 wherein said method further comprises the following steps:
    transferring the key area parameters under control of the computer software program in conjunction with a computer graphics card; and
    defining the color key under control of a computer software program in conjunction with the graphics card.

3. A method for inserting video data from a TV card into a computer display image of a computer system, said method comprising the steps of:
    transferring key area parameters from the computer operating system to a TV card, the key area parameters defining a size and a position of a window in the computer display image;
    generating a color key;
    generating, in a graphics card, responsive to the key area parameters, an imbedded color key area on the window in the computer display image for displaying the input video image;
    generating a color key signal which has a first value when picture elements in the key area are being sent to the display in the key area and a second value otherwise;
    transferring at least one synchronizing signal between the TV card and the graphics card to synchronize the TV card and the graphics card with each other;
    providing, responsive to the color key signal having the first value, the video data from the TV card to a computer monitor comprising the following steps:
        decoding a video stream encoded according to the Moving Picture Experts Group (MPEG) standard to provide a full screen video signal;
        demodulating a video signal conforming to the National Television Systems Committee (NTSC) standard to provide an alternative full screen video signal;
        scaling one of the full-screen video signal and the alternative full-screen video signal according to the key area size received from the graphics card to produce a scaled video signal
        positioning the scaled video signal according to the key area coordinates received from the graphics card; and
        adding, as a color background, the color key received by the graphics card; and
    providing, responsive to the color key signal having the second value, the computer display image to the computer monitor.

4. The method of claim 1 wherein the step of providing, responsive to the color key signal having the first value, the video data from the TV card is performed under control of a microprocessor in said TV card.

5. Apparatus for inserting an externally supplied video image into a computer graphics image comprising:
    a window keyer;
    a graphics card;
    a TV card connected to receive and convert an input video stream to produce a video image and, responsive to externally provided synchronization signals, providing horizontal and vertical synchronization signals to the graphics card to synchronize the video image and the computer graphics image;

wherein the graphics card configured to provide the computer graphics image, having an embedded color key signal, position and size of insertion to the window keyer, and the window keyer is connected to the TV card and the graphics card for providing the video stream and the computer graphics image to the computer display.

6. Apparatus as in claim 5 wherein said TV card comprises:
   a memory;
   a first video decoder coupled to receive the video stream and configured, in conjunction with the memory to decode the video stream to produce a video image;
   a video scalar connected to receive the decoded video image and to scale the decoded video image;
   multiplexer connected to receive the scaled video image and a background color for substituting the background color for areas other than the scaled video image;
   a matrix connected to receive, an analog component signal, including a luminance component and two color difference components, for providing red, green and blue primary color signals to a monitor;
   a second video decoder connected to receive and demodulate analog television signals for providing a signal key signal for switching from a computer desktop image and the scaled video and for providing an alternative video input signal to the video scalar; and
   a controller coupled to provide control signals to the first video decoder, the video scalar, the multiplexer, and the second video decoder.

7. Apparatus as in claim 5, wherein said window keyer further comprises:
   control logic for receiving the computer graphics image from the graphics card to provide, responsive to pixels having a key color value in said computer graphics image, a key control signal; and
   a multiplexer coupled to receive the delayed computer graphics image and the TV card video stream and, upon receiving the key control signal, to pass the computer graphics image and video stream video to the computer display.

8. Apparatus as in claim 7 wherein said control logic further comprises:
   a non-additive mixer for mixing the computer graphics image color components and for providing the mixed components to a peak detector;
   a peak detector for receiving the output of the non-additive mixer and for providing a positive reference signal;
   a box car wave shaping circuit for detecting the desktop horizontal synchronization pulse and providing a clamp switching signal;
   a first voltage comparator for providing an output signal whenever the first color component of signal level exceeds a first reference voltage;
   a second voltage comparator for providing an output signal when the second component of signal is less than a second reference threshold;
   a third voltage comparator for providing an output signal when the third component of signal exceeds a third reference threshold; and
   an AND gate for adding the first color component, second color component and third color component signal outputs to provide an output color key signal when the first color component of signal, the second color component of signal and the third color component of signal are present.

9. Apparatus as in claim 5, wherein said window keyer comprises:
   the TV card configured to provide a video image and a signal key, the signal key defining times at which the video image is to be displayed and times at which the computer graphics image is to be displayed;
   the graphics card for providing the computer graphics image; and
   a multiplexer coupled to receive the computer graphics image and the TV card video image and, upon receiving the signal key, to pass the computer graphics image and video image to the computer display.

10. Apparatus for inserting an externally supplied video image into a computer graphics image comprising:
   a TV card connected to receive and convert an input video stream to produce a video image and provide horizontal and vertical synchronization signals, to synchronize the video image and the computer graphics image;
   a graphics card configured to a) provide the computer graphics image, having an embedded color key signal, and b) configured to externally receive the horizontal and vertical synchronization signals from the TV card;
   a window keyer connected to the TV card and the graphics card for merging the video image provided by the TV card with the graphics image to be provided, to the computer display.

* * * * *